United States Patent [19]
Manlove

[11] Patent Number: 5,459,960
[45] Date of Patent: Oct. 24, 1995

[54] NURSERY CONTAINER

[76] Inventor: Steven F. Manlove, P.O. Box 1162, Stevensville, Md. 21666

[21] Appl. No.: 266,564

[22] Filed: Jun. 28, 1994

Related U.S. Application Data

[63] Continuation-in-part of Ser. No. 120,955, Sep. 15, 1993, abandoned.

[51] Int. Cl.⁶ .................................................... A01G 9/02
[52] U.S. Cl. .................................................... 47/66; 47/73
[58] Field of Search ............................... 47/66, 66 D, 73

[56] References Cited

U.S. PATENT DOCUMENTS

| | | | |
|---|---|---|---|
| 1,775,831 | 9/1930 | Salisbury | 47/66 |
| 2,859,557 | 11/1958 | Lattuca | 47/66 |
| 3,147,569 | 9/1964 | Murguia | 47/66 D |
| 3,896,587 | 7/1975 | Insalaco | 47/66 |
| 3,961,443 | 6/1976 | Insalaco | 47/66 |
| 4,173,097 | 11/1979 | Staby | 47/66 |

FOREIGN PATENT DOCUMENTS

| | | | |
|---|---|---|---|
| 800066 | 6/1936 | France | 47/66 |
| 1191621 | 4/1965 | Germany | 47/66 |
| 4000950 | 7/1990 | Germany | 47/66 |
| 3902885 | 8/1990 | Germany | 47/66 |
| 103027 | 1/1917 | United Kingdom | 47/66 D |
| 1069101 | 5/1967 | United Kingdom | 47/66 |

Primary Examiner—Ramon S. Britts
Assistant Examiner—Joanne C. Downs
Attorney, Agent, or Firm—Michael Marinangeli

[57] ABSTRACT

A nursery container that provides an improved root structure for plants intended to be transplanted into the ground. This container is characterized by a base that is constructed to direct initial root growth towards an elevated opening that is centrally located in the base. It is through this opening where initial root growth is air pruned thus encouraging the early development of secondary lateral roots. The base design also serves to aerate the growing medium in the center of the container thus aiding in the reduction of medium compacting and drainage. This container is also characterized by a plurality of vertical indentations that protrude towards the periphery of the container, each one being open at the bottom. Because of these indentations the root tips are encouraged to grow down towards the openings for air pruning thus continuing the development of lateral roots. The indentations also serve to aerate the growing medium in the sidewall area. Furthermore this improved nursery container is designed to compensate for material thinning which is a characteristic of all thermoformed products. It also compensates for the limitations placed on nursery container design by the production method of blowmolding plastic containers.

3 Claims, 3 Drawing Sheets

NURSERY CONTAINER

This is a Continuation In Part Application of application Ser. No. 08/120,955 filed Sep. 15, 1993 which is to be abandoned upon receipt and entry of this CIP Application.

BACKGROUND OF THE INVENTION

1. Field of the Invention

This patent relates to an improved nursery container for plants, in particular to a nursery container that provides an improved root structure for plants intended to be transplanted into the ground. This container is constructed of plastic material, preferably post consumer, via a Melt Phase Rotary Thermoforming process or through conventional methods of Thermoforming.

Furthermore this improved nursery container is designed to compensate for material thinning which is a characteristic of all thermoformed products. It also compensates for the limitations placed on nursery container design by the production method of blowmolding plastic containers.

2. Description of the Prior Art

Plants growing in smooth walled plastic containers generally have root systems that quickly grow towards the base of the container. When the roots reach the container base they change direction in response to the lack of an opening. The roots continue to grow, without ample lateral root growth, in a spiral or circular pattern that is well known in the art to be detrimental to plant growth.

This type of growth continues until the roots come into contact with an obstruction and become trapped or until they continue to grow and exit through an opening in the container wall or bottom. Either one or both of these events can contribute to the slowing or termination of root growth. Once the root growth is slowed or terminated, the dominance of the root tip is lost and the development of secondary lateral roots along the length of the root is promoted. While prior art methods have been utilized to discourage spiral and circling root growth, it still occurs and the development of lateral root growth has not been optimized.

An important disadvantage of prior art is that lateral root growth is not promoted until the roots are of a sufficient length to be affected by the container's attributes. In other words, the roots grow for an extended period of time before further lateral root growth is forced by the container's attributes. Subsequently the realization of improved plant health is delayed. Such containers are described in U.S. Pat. No. 4,442,628 issued Apr. 17, 1984; in U.S. Pat. No. 4,497,132 issued Feb. 5, 1985 and in West German Pat. No. DE 4000950 A1 issued Jan. 16, 1989.

The container described in U.S. Pat. No. 3,785,088 issued Jan. 15, 1974 is limited by the loss of growing medium through the holes that extend circumferentially around the pot.

The container described in U.S. Pat. No. 1,775,831 issued Feb. 23, 1927 provides a certain amount of aeration. However it does not provide for a sufficient amount of drainage or irrigation through the small and limited number of drain holes in the bottom. The number and size of these drain holes is limited by the intersection of the inwardly pointing cone's base diameter and the side wall of the container. Furthermore, since the drain holes are limited in number and size, an insufficient amount of openings are presented for the proper air pruning of roots. In addition the smooth interior walls of this container do not discourage spiral or circular root growth.

Other disadvantages of prior art include insufficient aeration and compacting of the growing medium near the center the container's base. Such a container is described in U.S. Pat. No. 4,716,680 issued Jan. 5, 1988. This is also demonstrated by the blowmolded polyethylene nursery containers commonly used by nurseries and sold in retail outlets across the nation. These disadvantages are caused by the flat bottom which is void of drainage and ventilation passages that would deliver and diffuse air into the center of the container to enhance aeration of the growing medium and root system.

Plants have also been grown in bottomless containers placed on either wire mesh or on polyethylene film both placed directly on the ground. Such containers are described in U.S. Pat. No. 5,099,607 issued Mar. 31, 1992 and U.S. Pat. No. 4,939,865 issued Jul. 10, 1990. It is well known in the art that growing plants in bottomless containers is not practical and is used on a limited basis. Such open bottomed containers are not easily moved or shipped to the point of sale without loss of growing medium or damage to the exposed roots.

Another example of prior art is the use of copper-containing compounds applied to the interior of blowmolded nursery containers to inhibit root elongation. While this method is successful, it is an expensive alternative and in most cases is not an economical solution for the correction of spiral and circular root growth.

It is also well known in the art that the previously mentioned inventions are not being mass produced and subsequently are not used in the art. The elaborate features of each design dictate complicated and expensive manufacturing processes that cannot compete economically with the ordinary manufacturing methods of thermoforming, blowmolding and thin-wall injection molding.

It is well known in the art that nursery containers are mass produced via blowmolding. This is accomplished by molding two containers simultaneously, oriented such that the rims of each container face each other so that they are formed and ejected from the mold in the shape of a barrel. This barrel is cut into two parts as a secondary operation, producing two nursery containers. A third operation punches drain holes into the container sidewall near the bottom.

A major disadvantage of blowmolding is that it is limited to the production of relatively smooth, plain and nondescript products that must be free of undercuts. These manufacturing design criteria's impact the nursery container by requiring it to have a flat bottom void of undercuts, contours, shapes or passages that would enhance drainage, aeration and lateral root growth.

Another disadvantage of the blowmolded nursery containers is the failure to have stacking lugs incorporated into the design to prevent the containers from jamming together. This impacts the efficiency of the growers filling operation.

By the present invention an improved nursery container is provided whereby the early development of secondary lateral root growth is encouraged through an improved method of redirecting and air pruning initial root growth. Also, this improved method of air pruning, aeration and drainage are presented through the practical design of a container which permits the efficient mass production of said containers.

SUMMARY OF THE INVENTION

A principle object of the present invention is to provide an improved nursery container that reduces the formation of spiral or circular root growth while promoting lateral root growth through the improved aeration, drainage and air pruning characteristics of said container.

It is an object of the present invention to provide such a nursery container wherein the initial root growth is directed inward towards the center of the container to an elevated hole or series of holes to be air pruned. This is in contrast to roots growing directly to the bottom of the container before growing out towards the sidewall to begin spiral or circular root growth.

Another object is to provide an improved method of redirecting and air pruning subsequent spiral and circular root growth.

A further object of the present invention is to provide such a nursery container that is interchangeable with containers that are presently used in the industry so as to remain compatible with the existing medium filling machines and carrier trays.

It is another object of this invention to provide a nursery container with a body that is constructed of three frustums of a cone oriented one over the other. The lower frustum's height is equivalent to approximately 25% of the container's height. The lower frustum's wall angle is greater than the middle frustum's so as to accommodate the nesting of a second container. The sidewall of both the lower and middle frustums contain a plurality of vertical indentations whose wall angles match that of the middle frustum. These indentations protrude towards the periphery of the container and are open at their base. The indentations redirect spiral and circled root growth, promote container aeration and the subsequent air pruning of the roots while not interfering with the normal nesting of a second container. The upper part of these vertical indentations meet with the top frustum whose wall angle matches that of the indentations and terminates at the containers flange.

A further object of this invention is to provide a nursery container with a base that is constructed with a concave frustum of cone. This frustum's height is equivalent to approximately 25% of the container height and its major diameter is less than the lower frustum's minor diameter so as to provide a level area for drain holes. The walls of this frustum contain a plurality of vertical indentations that protrude toward the center cone of the container and are open at their base. The frustum's wall angle is equal to or greater than the container's middle and upper frustums so as to accommodate the nesting of a second container. The minor diameter of the frustum holds a convex frustum of a cone to redirect initial root growth towards an opening at its' center. Grooves radiate from the center of the container on the level portion of the base so as to efficiently deliver air to the concave frustum, its' vertical indentations and through holes. The grooves intersect with the lower and concave frustums, it is at these points where corner chamfers are located so as to prevent thinning of the plastic material during thermoforming.

It is another object of this invention to provide a nursery container that reduces compacting of the growing medium through the improved drainage and aeration characteristics of the base.

A further object of this invention is to provide a nursery container with a turned down flange located on the major diameter of the upper frustum that is thicker than the sidewall of the container so as to accommodate container handling.

A plurality of random indentations are placed at a point where the side walls and the base intersect for the purpose of keeping nested containers separate. These indentations also serve to trap root tips and promote lateral root growth.

A plurality of drain holes are arranged in the base to accommodate drainage, aeration and to some extent air pruning of the roots.

It is a further object of this invention to provide an improved method of nursery container aeration, drainage and root pruning through the practical design of a thermoformed container whereby the efficient mass production of said containers is made possible.

These and other objects of the present invention are described in the accompanying drawings and the preferred embodiment.

DESCRIPTION OF THE PREFERRED EMBODIMENT

Figure 1:
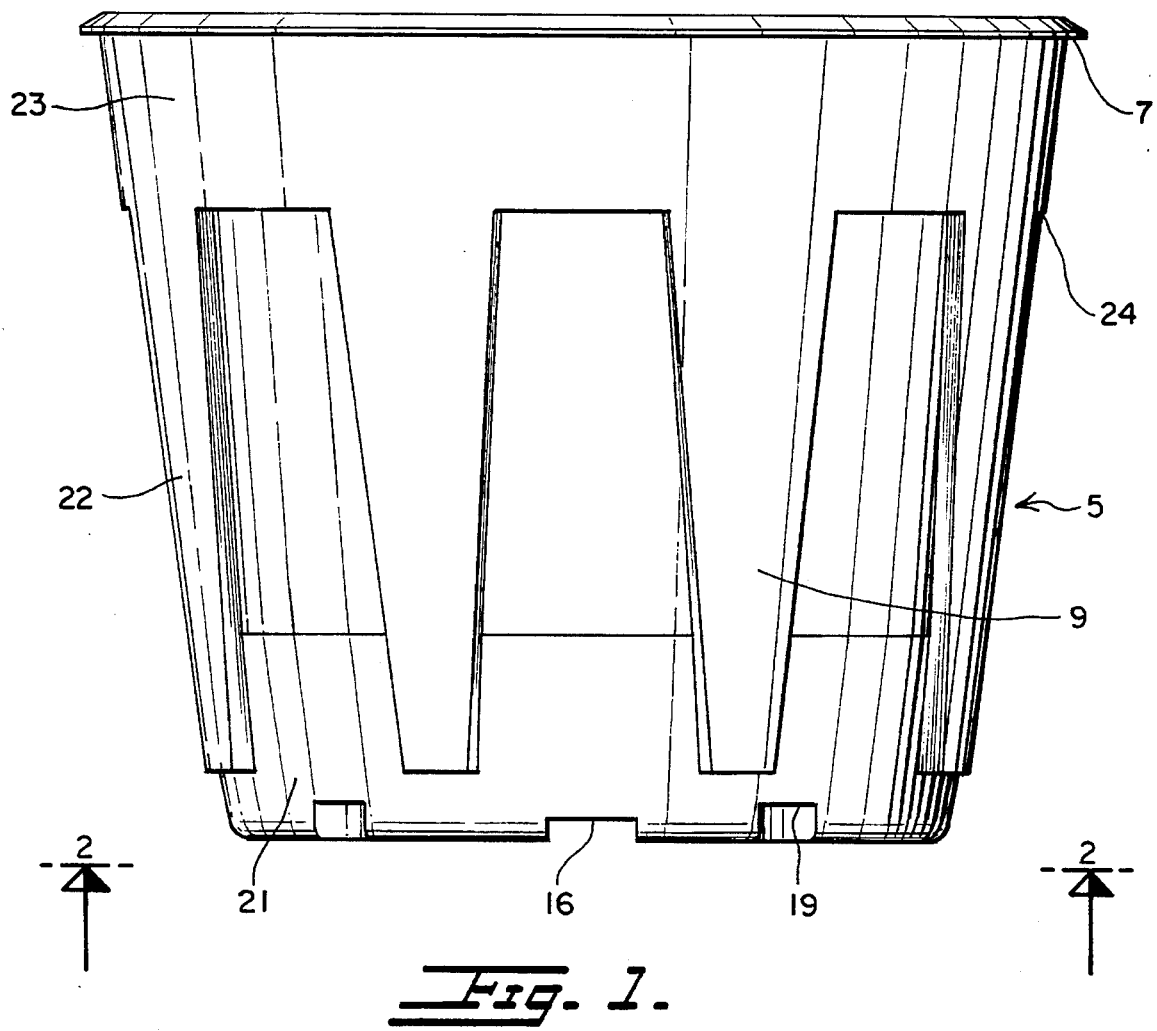
FIG. 1 is a front elevation view of the improved nursery container.

Referring now in more detail to the application's drawings, particularly to FIG. 1, there is shown in elevation the improved nursery container 5 of the present invention. The container is preferably composed of semi rigid recycled post consumer plastic via a melt phase thermoforming process or through conventional methods of thermoforming. It may also be injection molded. The sidewall thickness 6 will commensurate with the size of the container and will be of a gauge that provides the required strength and rigidity while sustaining the economical manufacturing and marketability of the container. The container dimensions are interchangeable with those that are presently used in the art so as to remain compatible with existing medium filling equipment, carrier trays and growing systems in general.

Figure 3:
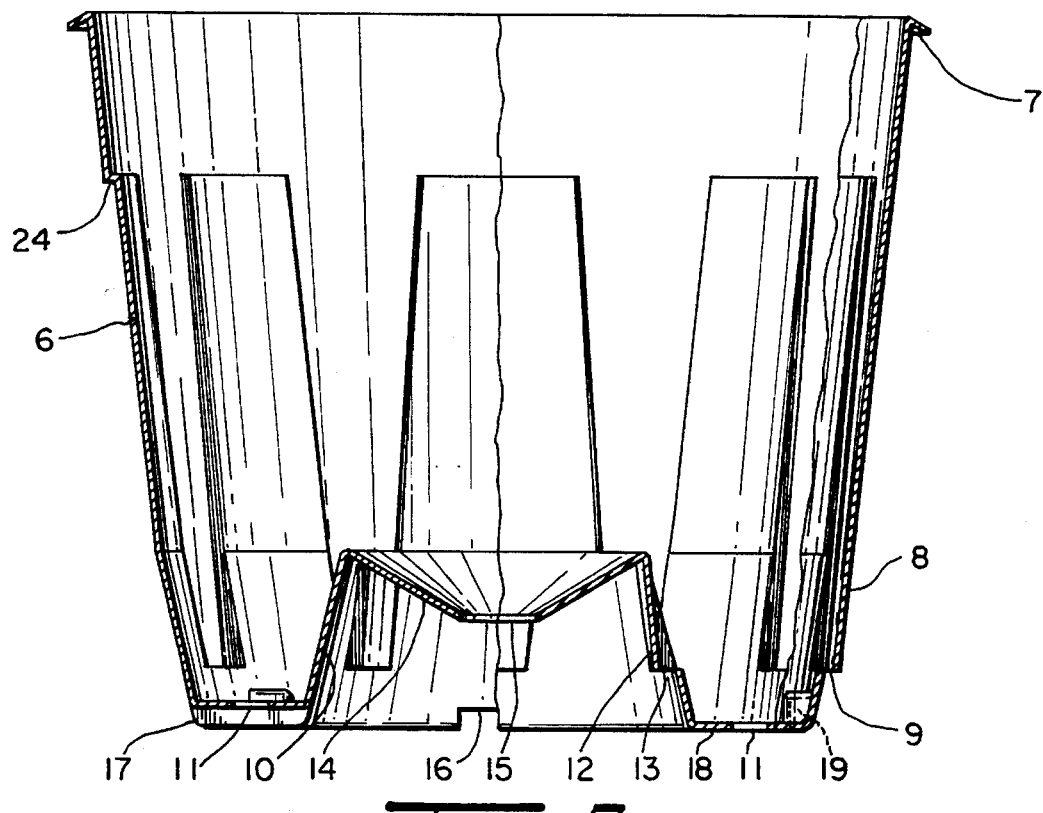
FIG. 3 is section view showing additional features of the invention.

As depicted in FIGS. 1 and 3, the upper portion of the container has a flange 7 that continues around the container's circumference. This flange 7 is 25% to 75% thicker than the container's sidewall 6 and is turned down giving strength to the open end of the container. The construction of the flange 7 provides a positive means to lift a filled container and to aid in the separation of two nested containers.

As depicted in FIG. 3, the container sidewall 6 is constructed of three frustums of a cone 21, 22 and 23 oriented one over the other to accommodate the nesting of two or more containers and to facilitate manufacturing. Protruding vertically along the sidewall 6 are a plurality of indentations 8 whose wall angles match those of the middle frustum 22. These indentations 8 protrude toward the periphery of the container 5 and are open at their base 9. The indentations redirect spiral and circled root growth, aerate the growing medium and air prune the roots while not interfering with the normal nesting of a second container. The upper part of these indentations 8 meet with the top frustum 23 whose wall angle matches that of the indentations 8 and terminates at the containers flange 7.

As shown in FIG. 1, the radial sidewalls of these indentations 8 are tapered at an angle that is greater than the middle 22 and top 23 frustums so that the nesting of two or more containers is possible. This geometry also supports the growing medium so as to prevent its' loss through the opening 9 at the base of the indentations and redirects spiraling and circling roots down towards the opening 9.

As shown in FIG. 3, the base of the container 5 is constructed of a concave frustum of a cone 10 whose height is equivalent to approximately 25% of the overall container height and whose wall angle is equal to or greater than the container's middle 22 and upper 23 frustums so as to accommodate the nesting of a second container.

The concave frustum 10 has a major diameter that is less than the minor diameter of the container's lower frustum 21 so as to provide a level area 18 for a plurality of radial grooves 16 and drain holes 11 that will accommodate the drainage of excess water and bottom irrigation of the plant.

The walls of the concave frustum 10 contain a plurality of vertical indentations 12 that protrude toward the centerline of the container and are open at their base 13 for the improved aeration and reduced compacting of the medium in the center of the container.

The minor diameter or top of the concave frustum 10 holds a convex frustum 14 of a cone to redirect root growth towards an opening 15 at its' center for the aeration of the growing medium and air pruning of roots.

Figure 2:
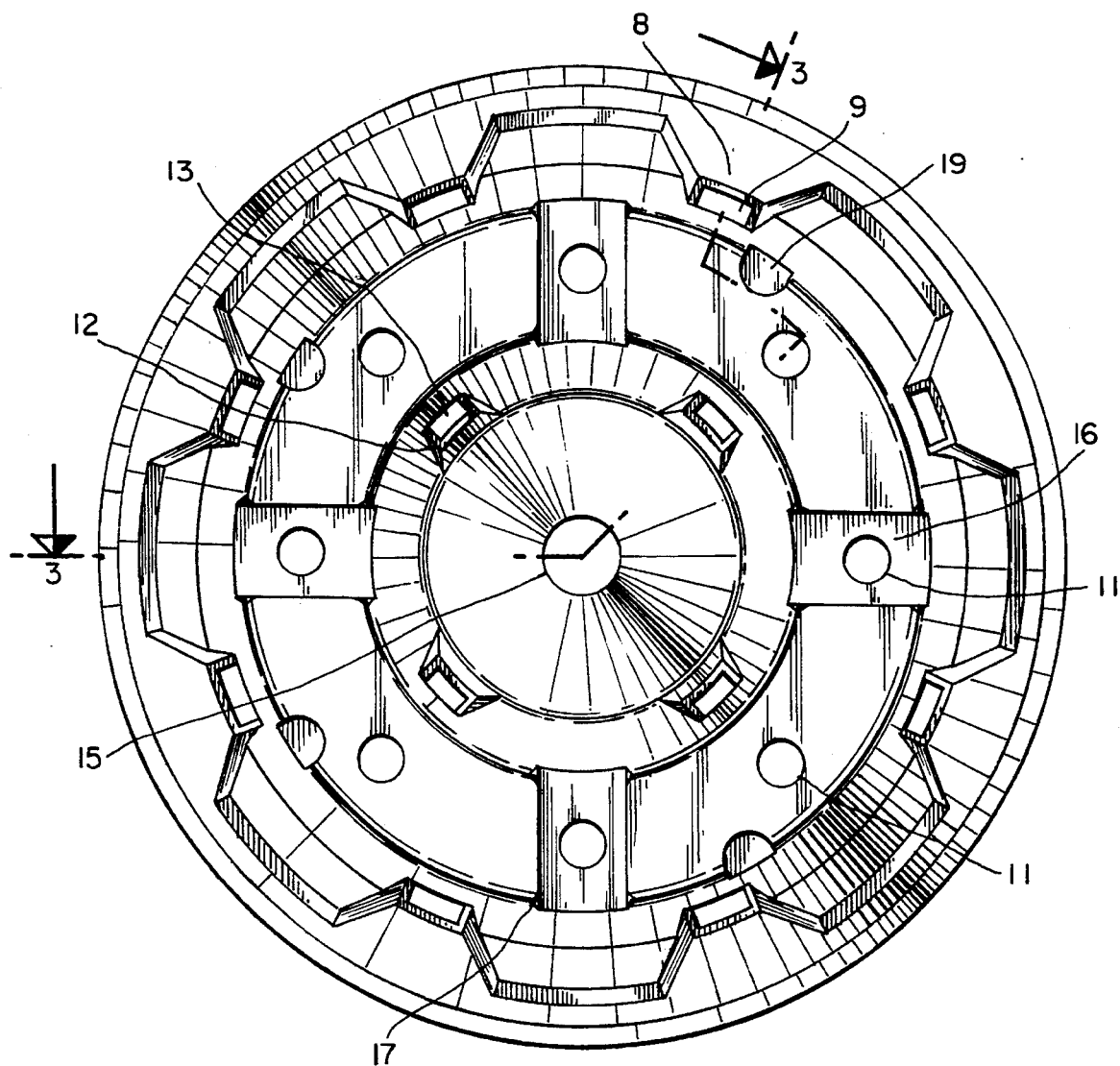
FIG. 2 is a bottom view of the nursery container.

Grooves 16 radiate from the center of the container on the level area 18 of the base so as to deliver air to the concave frustum 10, its' vertical indentations 12 and through holes 11, 13 and 15. These grooves intersect with the container's lower 21 and concave 10 frustums, it is at these points a total of four corner chamfers 17 per groove 16 are located so as to prevent thinning of the plastic material during thermoforming. A total of sixteen chamfers 17 are represented in FIG. 2.

A plurality of random indentations 19 are placed at a point where the container's 5 lower frustum and the level area 18 intersect for the purpose of keeping two or more nested containers separate. These indentations 19 also serve to trap root tips to promote lateral root growth.

Figure 4:
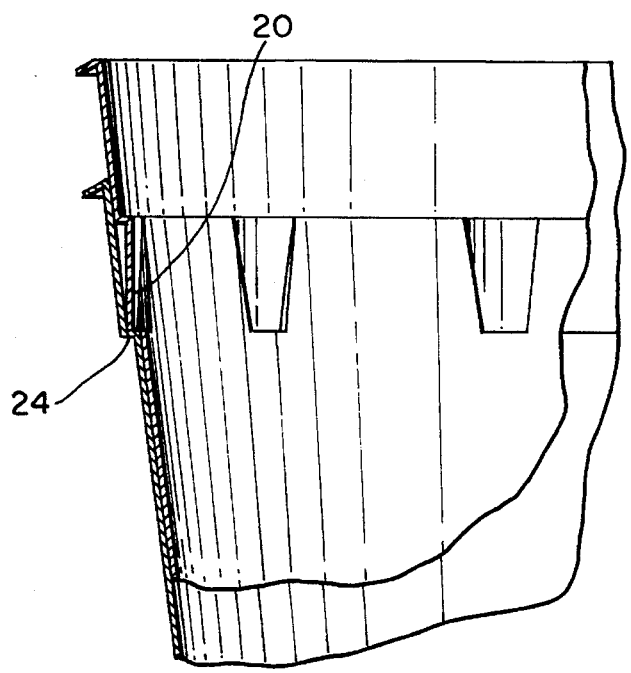
FIG. 4 is a side view of an alternate means of keeping nested containers separated.

FIG. 4 describes an alternate method of nested container separation by using an undercut lug 20 between each vertical indentation 8. The base of the lug rests upon the ledge 24 created by the intersection of the container's upper 23 and middle 22 frustums thus preventing nested containers from jamming together.

While the present invention has been described in the preferred embodiment, modifications and changes may be made without departing from the scope of the invention as claimed.

I claim:

1. A nursery container that provides an improved root structure for plants intended to be transplanted into the ground comprising:

a base having a level portion;

a frustum of an inverted cone arranged in said base, and having a sidewall, said frustum having a height which is equal to approximately 25% of the container's height;

a plurality of inwardly pointing vertical indentations, each indentation having an opening at its bottom, said indentation being located on the sidewall of said base's frustum;

a frustum of a cone, having an opening in the center of its minor diameter, being arranged at the top of said base's frustum;

said nursery container further having a sidewall construction of three frustums of a cone oriented one over the other with the upper frustum terminating as a flange;

said sidewall construction having a plurality of outwardly pointing vertical indentations, each vertical indentation having an opening at its bottom;

a plurality of grooves, said grooves radiating from the center of the container on the level portion of said base, and arranged so that each groove intersects with the base's frustum and sidewall;

a chamfer, said chamfer positioned at each vertical indentation of said sidewall construction and;

a plurality of random indentations being arranged at a point where the container's lower frustum of said sidewall construction and the level portion of said base intersect for the purpose of keeping two or more nested containers separate.

2. The container of claim 1 wherein radial sidewalls of said vertical indentations of said sidewall construction are tapered at an angle that permit the nesting of two or more containers, and supports a growing medium so as to prevent the mediums loss through the opening at the bottom of the indentations, allows for easy removal of the medium at the time of transplanting and encourages the growth of roots down towards the opening.

3. The container of claim 2 wherein said vertical indentations of said sidewall construction are open at the bottom to permit aeration of the medium and the air pruning of elongated roots that have been directed to these openings.

* * * * *